US012646088B2

(12) United States Patent
Yesawich et al.

(10) Patent No.: US 12,646,088 B2
(45) Date of Patent: Jun. 2, 2026

(54) DEMAND GENERATION SYSTEM AND METHOD

(71) Applicant: The County of Palm Beach, Florida, West Palm Beach, FL (US)

(72) Inventors: Peter Yesawich, West Palm Beach, FL (US); Milton Segarra, West Palm Beach, FL (US); Gustav Weibull, West Palm Beach, FL (US); Bryan Glynn, West Palm Beach, FL (US)

(73) Assignee: The County of Palm Beach, Florida, West Palm Beach, FL (US)

( * ) Notice: Subject to any disclaimer, the term of this patent is extended or adjusted under 35 U.S.C. 154(b) by 0 days.

(21) Appl. No.: 18/607,153

(22) Filed: Mar. 15, 2024

(65) Prior Publication Data

US 2025/0292269 A1 Sep. 18, 2025

(51) Int. Cl.
*G06Q 30/0202* (2023.01)
*G06Q 30/0204* (2023.01)
*G06Q 50/12* (2012.01)

(52) U.S. Cl.
CPC ..... *G06Q 30/0202* (2013.01); *G06Q 30/0204* (2013.01); *G06Q 50/12* (2013.01)

(58) Field of Classification Search
CPC ............................... G06Q 10/02; G06Q 50/12
USPC ........................................................ 705/7.13
See application file for complete search history.

(56) References Cited

U.S. PATENT DOCUMENTS

| | | |
|---|---|---|
| 2007/0075136 A1 | 4/2007 | Jacob |
| 2014/0222518 A1 | 8/2014 | Adkins et al. |
| 2020/0134696 A1 | 4/2020 | Lardeux et al. |
| 2021/0390568 A1* | 12/2021 | Shariff ............... G06Q 30/0202 |
| 2022/0414557 A1 | 12/2022 | Cho et al. |

OTHER PUBLICATIONS

"Demand forecasting model using hotel clustering findings for hospitality industry" Published by Elsevier (Year: 2022).*
International Search Report and Written Opinion, PCT/US2025/019907, May 7, 2025.

* cited by examiner

*Primary Examiner* — Zeina Elchanti
(74) *Attorney, Agent, or Firm* — Akerman LLP

(57) ABSTRACT

A business demand generation system may generate a demand score based on typical demand and predicted future demand from a business segment mix for a future time period. The demand score is processed through a action recommendation model to generate an actionable recommendation that is tied to an attribution model that evaluates the impact of the recommended action on actual segmental demand of a business. The evaluated impact is fed back through the recommendation model to create a continuous learning loop that refines the model to improve future recommendations to drive better and more accurate results.

18 Claims, 7 Drawing Sheets

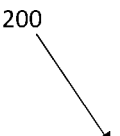

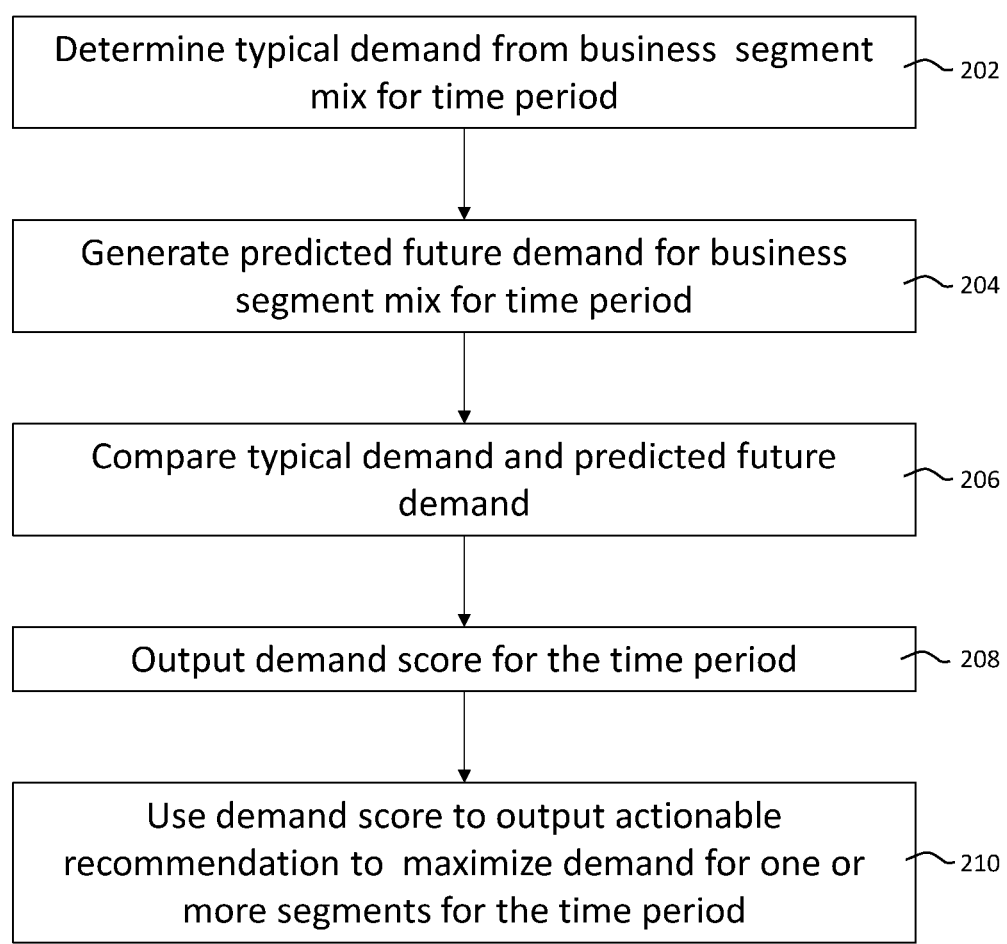

200

| Determine typical demand from business segment mix for time period | ~ 202 |

Generate predicted future demand for business segment mix for time period ~ 204

Compare typical demand and predicted future demand ~ 206

Output demand score for the time period ~ 208

Use demand score to output actionable recommendation to maximize demand for one or more segments for the time period ~ 210

FIG. 2

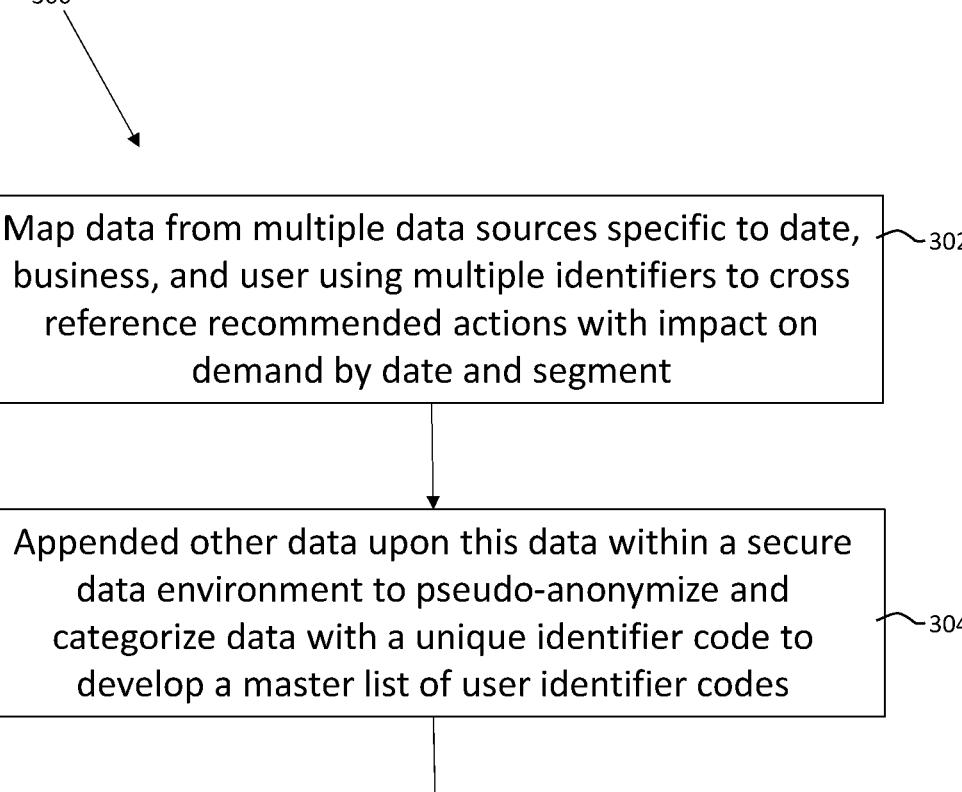

300

Map data from multiple data sources specific to date, business, and user using multiple identifiers to cross reference recommended actions with impact on demand by date and segment — 302

Appended other data upon this data within a secure data environment to pseudo-anonymize and categorize data with a unique identifier code to develop a master list of user identifier codes — 304

Assign the master list of identifier codes back to partner data for attribution modeling — 306

As new past demand data is gathered over time, assess effectiveness of recommended actions by attribution using machine learning          402

Generate a relative impact score for each recommended action          404

Refine the action recommendation model with the impact scores for each recommended action          406

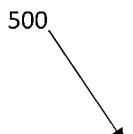

500

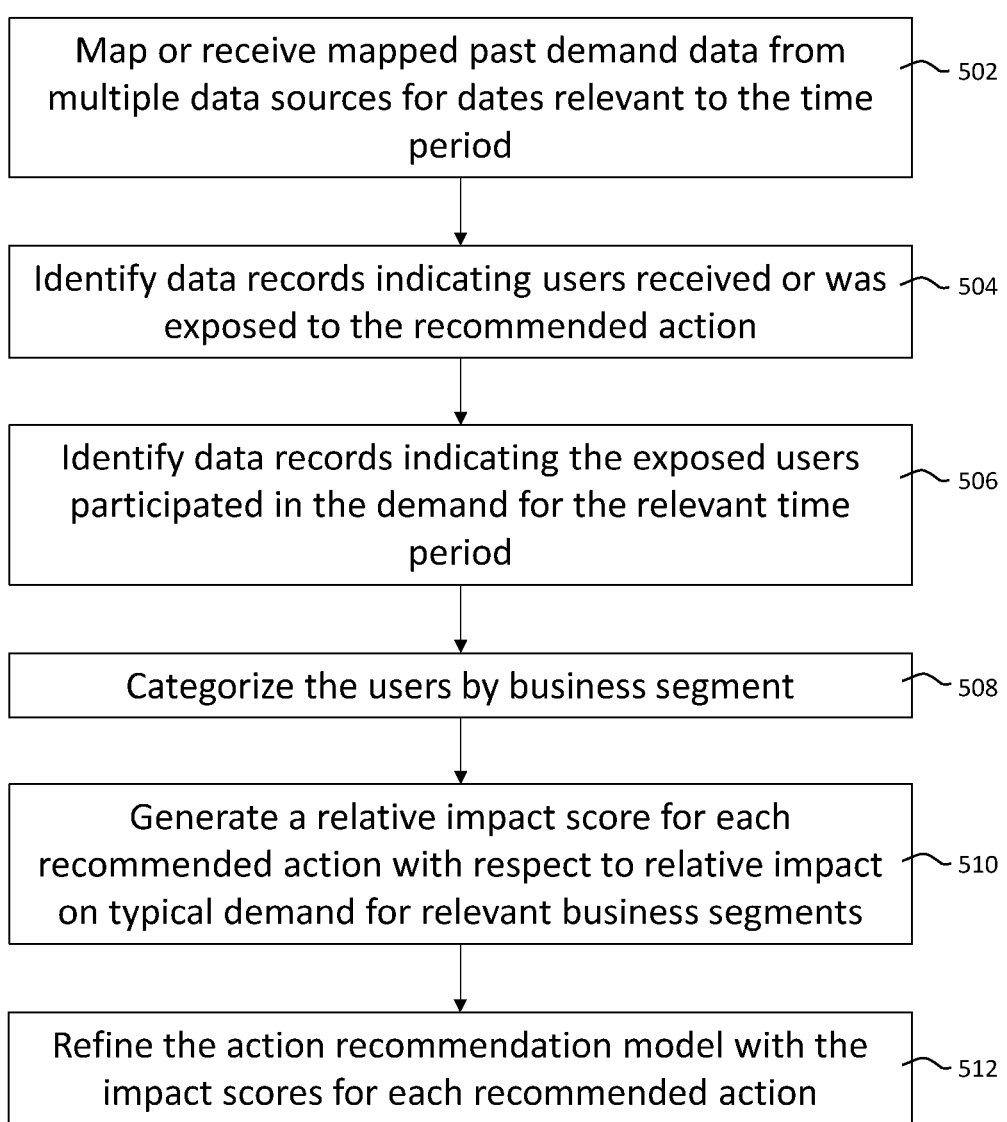

| Map or receive mapped past demand data from multiple data sources for dates relevant to the time period | ~ 502 |

| Identify data records indicating users received or was exposed to the recommended action | ~ 504 |

| Identify data records indicating the exposed users participated in the demand for the relevant time period | ~ 506 |

| Categorize the users by business segment | ~ 508 |

| Generate a relative impact score for each recommended action with respect to relative impact on typical demand for relevant business segments | ~ 510 |

| Refine the action recommendation model with the impact scores for each recommended action | ~ 512 |

FIG. 5

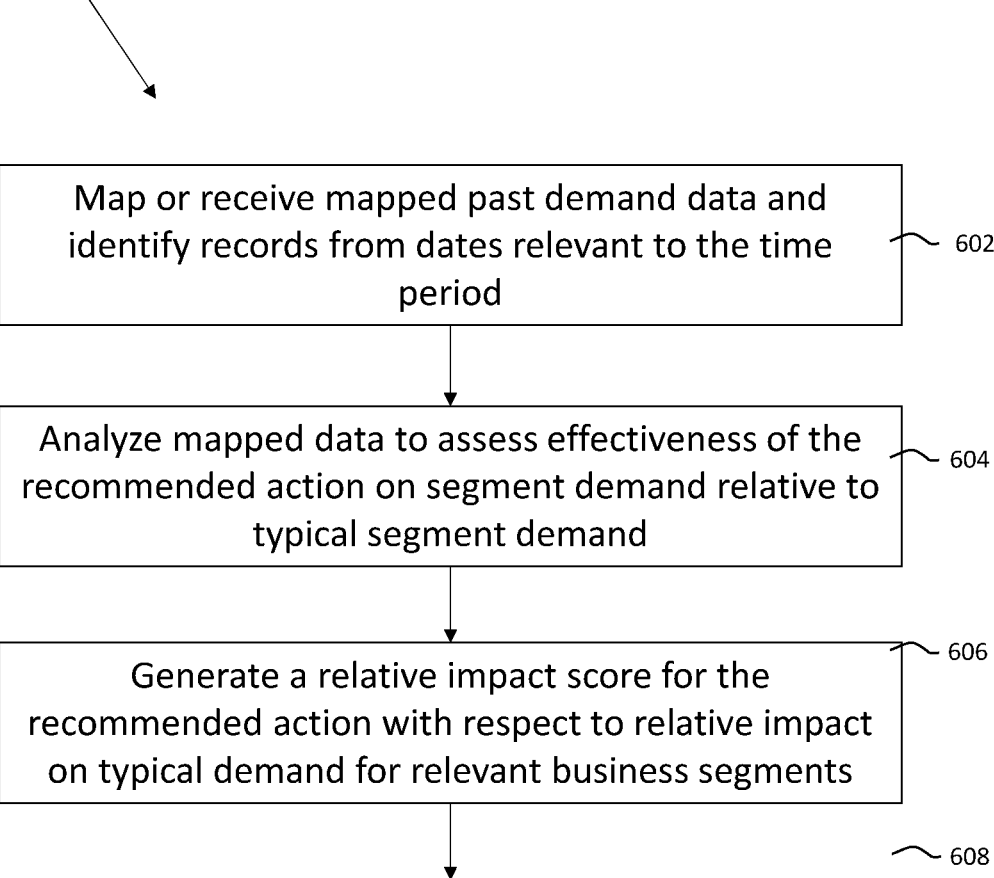

600

Map or receive mapped past demand data and identify records from dates relevant to the time period ⌐ 602

Analyze mapped data to assess effectiveness of the recommended action on segment demand relative to typical segment demand ⌐ 604

Generate a relative impact score for the recommended action with respect to relative impact on typical demand for relevant business segments ⌐ 606

608

Refine the action recommendation model with the impact score for the recommended action

FIG. 6

DEMAND GENERATION SYSTEM AND METHOD

TECHNOLOGY

This present application is directed to predicting future demand and outputting an actionable recommendation to increase demand based on proven actions and results.

BACKGROUND

Businesses operating in the tourism and hospitality industry face a challenging environment when it comes to predicting future demand and evaluating effectiveness of efforts to increase demand. For example, tourism and hospitality is often at the mercy of external fluctuations in economic conditions that can affect both business and consumer spending. Consumer preferences with respect to destination, business in which they support, planning cycles, and the like may also be affected by a complex web of external factors, that are often unpredictable. Competitive factors such as marketing and pricing by the businesses, local competitors, or other competitors may divert or stifle demand. Actions by local and remote market participants may shift consumer travel to other destinations. Actions within other industries may provide alternative outlets for consumer spending. Relocation of events away from businesses and introduction of new or competing events in other destinations may also shift consumer travel behavior. Seasonal fluctuations in demand are also commonplace in the tourism and hospitality industry. Tourism and hospitality businesses are also varied by location, scale, and consumer segment focus. All the above may also differentially impact various consumer segments. These and other internal and external factors complicate accurate prediction of future demand and evaluation of efforts to increase demand.

Historical and other data relevant to macro level, micro level, industry, and business specific economic conditions and related consumer activity and sentiment helpful for predicting demand are dispersed among a potentially unknowable number of data sources or unavailable. And even if relevant historical and other data can be obtained from identifiable data sources, the accuracy of the data for purposes relevant to forecasting or evaluation of effectiveness of demand generation actions can be difficult or impossible to ensure. Legal barriers also complicate the ability of businesses to share data that can track consumer activities across multiple mediums and interactions. Thus, identifying, obtaining, and processing relevant data for forecasting demand and evaluating efforts to increase demand is often reduced to a guessing game based on incomplete, inaccurate, and irrelevant data.

What is needed is new and improved systems and methods for forecasting demand and evaluating effectiveness of efforts to increase demand.

SUMMARY

In one aspect, a business demand generation system may be configured to determine typical demand of a business that is attributable to the various business segments of the business's business segment mix for a future time period using past demand data. A prediction generator may be configured to predicted future demand from the business segments of the business segment mix for the future time period using future demand data. Typical demand from the business segments of the business segment mix may be compared with the predicted future demand from the business segments of the business segment mix. A demand generation model may generate a demand score based at least in part on the comparison. A recommendation module may be configured to receive the demand score and input the demand score into an action recommendation model. The action recommendation model may process the demand score and output an actionable recommendation that maximizes demand for one or more from the business segments of the business segment mix for the future time period. A data processor may be configured to map or receive mapped past demand data, which may be from multiple data sources, for dates relevant to the future time period and action specified by the actionable recommendation. The mapped data may include data records associated with unique identifier codes, each corresponding to a user. Using the data records, a attribution process may identify a set of one or more users associated with data records revealing exposure to the action specified by the actionable recommendation output by the action recommendation model, and corresponding demand impact to the business during the future time period. The attribution process may categorize the users in the set of one or more users into business segments. An attribution model may be configured to generate a relative impact score for the actionable recommendation that is representative of relative demand impact attributable to the action specified by the actionable recommendations for impacted business segment. The relative impact score may be used to further refine the action recommendation model for each impacted business segment.

In one example, differential weighting is applied to future demand data elements with respect to business segments. The weighting may be reflective of predictive value of the future demand data element to future demand associated with the respective business segment.

In a further example, machine learning may be applied to constantly assess predictive value of future demand data elements for respective business segments to adapt weighting to business condition, time of year, consumer behavioral change, or combination thereof.

In one example, future demand data may be weighted by relative importance to predictive value for each business segment represented in the business segment mix.

In one example, the business is a hotel. In a further example, the business segment mix includes business transient, marketable leisure travelers which may optionally be further segmented by location (e.g., highway, downtown, beach), key demographics, travel motivations, or the like, visiting friends/family, special events, business events, sports groups, scale (e.g., luxury, upscale, midscale), or combination thereof.

In one example, the actionable recommendation includes a value representing a predicted expectation of demand if the action specified by the actionable recommendation is taken.

In one example, the actionable recommendation includes a plurality of actionable recommendations. The plurality of actionable recommendations may be ranked by one or more of predicted effectiveness of the action specified by the actionable recommendation increasing demand, predicted cost associated with the action specified by the actionable recommendation, predicted return on investment, or combination thereof.

In one example, the actionable recommendation includes a plurality of actionable recommendations. The plurality of actionable recommendations may be ranked by one or more of most impactful on segment demand, most impactful on aggregate demand, or a specialized consideration with respect to an attribute of the business.

In another aspect, a method of facilitating increased demand may include determining, with a demand generator including a demand prediction model, typical demand for a business with respect to a plurality of business segments of a business segment mix for a future time period using past demand data. The method may further include generating, with the demand generator, predicted future demand for the business from the respective business segments of the business segment mix for the future time period using future demand data. The demand generator may compare the typical demand from the business segments of the business segment mix with the predicted future demand from the business segments of the business segment mix. The demand generator may further generate a demand score based at least in part on the comparison. The demand score may be input into an action recommendation model to output an actionable recommendation that maximizes demand from one or more of the business segments of the business segment mix for the future time period. The method may further include mapping or receiving mapped past demand data from multiple data sources for dates relevant to the future time period and action specified by the actionable recommendation. The mapped data may include data records associated with unique identifier codes, each corresponding to a user. The method may further include identifying, via the data records, a set of one or more users associated with a data record revealing exposure to the action specified by the actionable recommendation and impact to the demand of the business during the future time period. The users in the set of one or more users may be categorized into business segments. The method may further include generating, with the attribution model, a relative impact score for the actionable recommendation that is representative of relative demand impact attributable to the action specified by the actionable recommendations for each business segment. The method may further include refining, with the attribution model, the action recommendation model with the impact scores for each business segment.

In one example, the method further includes differentially weighting future demand data elements with respect to business segments. The weighting may be reflective of predictive value of the future demand data element to future demand associated with the respective business segment.

In one example, the method further includes applying machine learning to constantly assess predictive value of future demand data elements for respective business segments to adapt weighting to one or more business conditions, times of year, consumer behavioral changes, or combination thereof.

In one example, the method further includes, weighting the future demand data by relative importance to predictive value for each business segments represented in the business segment mix.

In one example, the business is a hotel. In a further example, the business segment mix includes business transient, marketable leisure travelers which may optionally be further segmented by location, (e.g., highway, downtown, beach), key demographics, travel motivations, or the like, visiting friends/family, special events, business events, sports groups, scale (e.g., luxury, upscale, midscale), or combination thereof.

In one example, the actionable recommendation includes a value representing a predicted expectation of demand if the action specified by the actionable recommendation is taken.

In one example, the actionable recommendation includes a plurality of actionable recommendations. The plurality of actionable recommendations may be ranked by one or more of predicted effectiveness of the action specified by the actionable recommendation increasing demand, predicted cost associated with the action specified by the actionable recommendation, predicted return on investment, or combination thereof.

In one example, the actionable recommendation includes a plurality of actionable recommendations. The plurality of actionable recommendations may be ranked by one or more of most impactful on segment demand, most impactful on aggregate demand, or a specialized consideration with respect to an attribute of the business.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 2 is a method of generating a demand score for a time period and an associated actionable recommendation to maximize demand during the time period with respect to one or more business segments according to various embodiments described herein;

FIG. 3 is a data mapping method used for attribution to determine effectiveness of recommended actions on demand according to various embodiments described herein;

FIG. 5 is a method of attribution and refining the action recommendation model according to various embodiments described herein;

FIG. 6 is a method of attribution and refining the action recommendation model according to various embodiments described herein.

DETAILED DESCRIPTION

Figure 1:
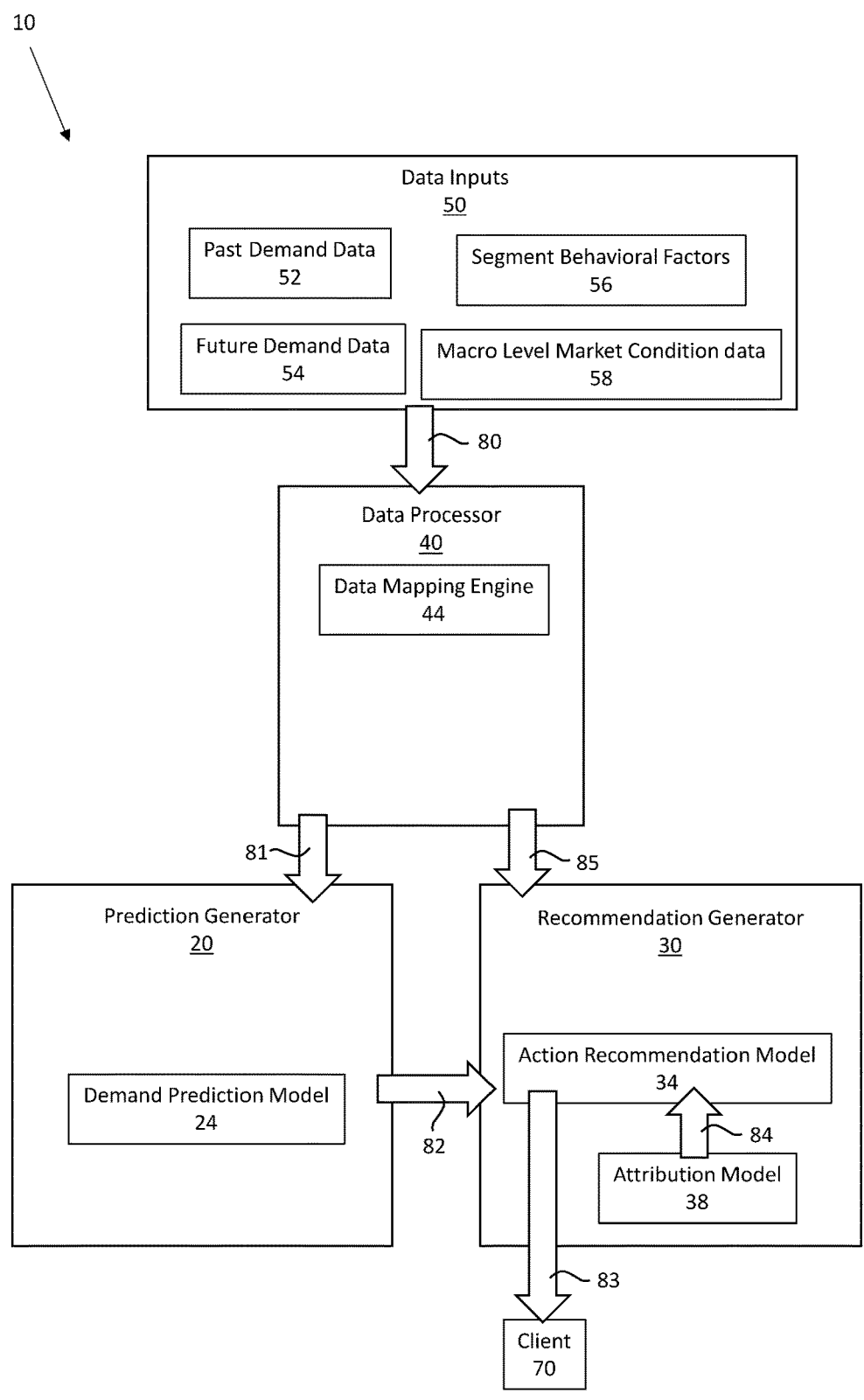
FIG. 1 is a schematic diagram of a demand generation system according to various embodiments described herein.

Current tourism and hospitality platforms provide data visualization tools that require an individual to read and interpret many data points and develop their own conclusion, absent any structured method to ensure correct interpretation or subsequent evaluation of the interpretation. That is, current platforms are merely data visualization tools that only report on specific data sets and fail to provide further analysis or recommended actions. These platforms do not aggregate the disparate data points or connect the flow of information in a way that performs future demand modeling, action recommendation to improve demand, assessment of actions to improve demand, or that may continually improve the above overtime to dynamically adapt to evolving conditions within the marketing industry. In contrast, the present description describes a demand generation system configured to combine different data sets from disparate data sources to develop predictive demand scoring and provide recommended actions utilizing the predictive demand scoring to drive future demand. For example, the demand generation system may be configured to combine relevant tourism and hospitality related data from multiple sources and create predictive models that predict future demand and output specific recommendations that are proven effective overtime through attribution and machine learning. In some embodiments, the demand generation system may be configured to remove reliance on human judgement and data interpretation while generating recommendations proven to increase demand in business segments. Providing recommended actions based on proven and attributed results by the demand generation system incorporates a unique combination of data resources that are mapped for assessment of effectiveness and fed back into the system to improve future recommendations.

In the tourism industry, current marketing or sales managers may have access to macro level data. Due to a lack of connectable presentation and sales data tied to efforts to increase demand, managers typically assume a direct relationship to industry performance and promotional efforts. In contrast, the demand generation system described herein may be configured to take data from multiple sources and develop a score that informs generation of an actionable recommendation that is tied to an attribution model to evaluate the effectiveness of the recommendation for a demand need represented in the score. The present description further solves the disparate data aggregation problem which allows for aggregating the data from multiple sources and running analytical models from this data to derive predicted performance which feeds automated recommendations. These recommendations may be driven through strategic partnerships and data aggregation. The actionable recommendations are tied to modeling of both recommendations and outcomes. In this way, a continuous learning loop is created that continually improves the generated recommendations to drive better results for future recommendations.

In contrast to previous methodologies, the present application combines the elements of recommended actions based on proven actions and results for predictive modeling. The demand generator system may be configured to accesses key data sources for accurate modeling of future demand and assessment of relative effectiveness of recommended actions. The predictions of future demand generated by the demand generation system may trigger output of automated, actionable recommendations to increase demand that are attributed to previous implementations resulting in increased demand to further drive decision making. The impact on demand corresponding to the performance of the recommendation may be tracked by the demand generation system via mapping and analysis of data sets from a variety of data sources to accurately attribute the action to the result. This attribution may be fed back into the recommendation features of the system to adjust future recommendation modeling based on predicted future demand.

With reference to FIG. 1, a demand generation system 10 may be configured to predict demand for a future time period and output a tactical recommendation to improve demand for the future time period.

The system 10 may include a prediction generator 20 comprising a demand prediction model 24 configured to generate a demand prediction for a future time period and output a demand score 82. As described in more detail below, the demand score 82 may be with respect to predicted demand for the relevant time period, such as a week, related to business segments. In various embodiments, the demand score 82 includes demand scores 82 for each business segment of a business segment mix with respect to a subject business. The system 10 may include a recommendation generator 30 including an action recommendation model 34 configured to output an actionable recommendation 83. The recommendation generator 34 may receive the demand score 82 output by the demand prediction model 24 for input into the action recommendation model 34. The action recommendation model 34 may use the demand score 82 to generate an actionable recommendation 83 that the business or other entity, which may be referred to hearing as a client 70, may take to increase demand. The recommendation generator 30 may further include an attribution model 58 configured to attribute the impact on demand 84 of the action with respect to the actionable recommendation 83. Utilizing machine learning the action's impact on demand 84 may be fed back into the action recommendation model 34 to adjust future modeling based on predicted future demand. This process creates a continuous learning loop that links actions to impact on business segment demand to improve future recommendations to drive increases in demand in the impacted business segments.

The system 10 may receive various data inputs. For example, the system 10 may include a data processor 40 configured to receive 80 data inputs 50. Data inputs 50 may include past demand data 52 and future demand data 54. The data processor 40 may transmit 81 past demand data 52 and future demand data 54 to the prediction generator 20. The data processor 40 may transmit 85 past demand data 52 and future demand data 54 to the recommendation generator 30. Past demand data 52 may include data that tends to inform past demand. While the present description is not limited to the type of industry client the system 10 may be applied, examples of types of past demand data 52 that may be utilized by the system for a hotel client may include historic demand of the client, visitation and spending data, actual group hotel occupancy from previous time periods, past event data, or combination thereof. Future demand data 54 may comprise future looking data, i.e., data that tends to inform future demand. Examples of future demand data 54 that may be relevant to a hotel client or other tourism or hospitality client may include one or more of actual group hotel room nights on the books for future dates, actual sports groups on the books for future dates, future event data, daily hotel search demand for future dates, percentage of unavailable hotels by day, advertised price levels of hotels by date, daily search demand data for flights, flight reservation data for future dates, actual reserved future room nights, source of reservations, client website traffic, or combination thereof. In some embodiments, one or more of the above or other future demand data 54 is provided by direct partner data sources. In one embodiment, past demand data 52 may also include past demand data of the same types as the future demand data 54, such as the examples provided above. The system 10 may analyze this past demand data 52 together with subsequent actual demand experienced by businesses with respect to various business sectors to assess the predictive value of various types of future demand data 54. In a further example, data inputs 50 may include one or more of segment behavioral factors 56, macro market level condition data 58, or combination thereof.

The data processor 40 may be configured to aggregate first and third party data sources. For example, the data processor 40 may be configured to integrate first party data with various third party data sources such as data from local tourism stakeholders (e.g., hotels, attractions, restaurants), competitors, industry sources, travel agencies, online booking platforms, internet service providers, geo tracking data, to name a few. In one embodiment, the data processor 40 is configured to integrate data from data sources selected from local tourism stakeholders (e.g., hotels, attractions, restaurants), industry partners such as online booking platforms (e.g., Expedia, TripAdvisor), and customer behavior data acquired through research.

The data processor 40 may include a data mapping engine 44 configured to map this disparate data and execute data mapping models, such as models or algorithms driven by machine learning, to connect data sets from a variety of data sources. Mapping may include assigning identifiers to match user level data. For example, the data may be processed into a data lake and secure data environment, such as a cleanroom, matched, and then run through model configured to connect a variety of data sources together. Through the data collection and secure data environment process, which may also form a part of the attribution process described herein, mapping codes may employ a variety of identifiers to join the data sources together to support accurate further modeling. The identifiers may include dates, IP addresses, or device IDs, as examples. The data mapping engine 44 may employ a methodology that develops identifier codes for each data partner data to join the data sources together. The data processor may transmit 85 mapped data to the recommendation generator 30. For example, data mapping may be used to drive the attribution model aspects that inform and refine the action recommendation model 34, which translates the demand score 82 output of the prediction model 24 into an actionable recommendation 83, which may also be referred to as and actionable tactic or similar herein. In one example, multiple identifiers are defined to cross reference relevant modeling to understand impact of actions on demand by date and segment. This mapping may be specific to date, business, and user. Mapping may include the use of first party cookies, pixels, device ID, IP address, business, date, time stamps, or other data relevant to mapping back to these sources. Other data may be appended upon the mapped data within a secure data environment, such as a cleanroom, to pseudo-anonymize and categorize data with a unique identifier code to develop a master list of users specified by a master list of codes. The master list of codes may be assigned back to secure data environment partner data for purposes of attribution and, in one embodiment, trend modeling.

As introduced above, the prediction generator 20 or demand prediction model 24 thereof may be configured to generate a demand score 82. Generating the demand score 82 may include determining typical levels of demand for one or more business segments based on past demand data 52. The demand prediction model 24 may be configured to predict future demand based on available future demand data 54 by segment relevant to the client 70 for the time period. Based on a delta between typical business sector mix and predicted future demand, the demand prediction model 24 outputs an actionable tactic directed to maximizing demand for a given period. In some embodiments, additional weighting and consideration are applied from an analysis of market conditions.

With reference to FIG. 2, a method of generating a demand score 82 for a time period and an associated actionable recommendation 83 to maximize demand during the time period with respect to one or more business segments 200 may include determining typical demand from a business segment mix for a time period 202. The method may also include generating predicted future demand for business segment mix for the time period 204. In one implementation, future demand data elements may be weighted by relative importance to predictive value for respective business segments as described herein. For example, future demand data elements may be differentially weighted with respect to predictive value for different business segments. The method 200 may further include comparing typical demand for the business segments and predicted future demand with respect to the business segments 206 to generate a demand score 82 for the time period to output 208 to the action recommendation model 34. The method 200 may further include using the demand score 82 to identify an actionable recommendation 83 to maximize demand for one or more segments for the time period 210.

Determining typical demand from business segment mix for a time period 202 may utilize past demand data 52. For example, the prediction generator 20 or demand prediction model 24 thereof may be configured to determine the typical levels of demand from each targeted business segment based on past demand data 52. The prediction generator 20 may model past demand data 52 using the demand prediction model 24 to determine typical business mix of identified business segments for the client 70. Business segments may be selected in consideration of the type of client entity, the business segments they serve, the area, or other considerations. Example business segments for a hotel client may include business transient, marketable leisure travelers which may be further segmented by location, key demographics, travel motivations, or the like, visiting friends/family, special events, business events, sports groups, scale of hotel, or combination thereof.

Further to the above, past demand data 52 and relative business segment demand levels may be modeled to determine typical business mix. For example, typical business mix may be derived from various data sets of past demand data 52. For instance, typical business mix for a hotel client may be derived from type of room occupancy, notations with respect to purpose of stay, such as association with an event, sports group, business, leisure, visiting friends or family, or other segment associated purpose. Past demand data 52 with respect to segment representation may include segment data generated from surveys, physical or software tracking, or other data. The past demand data 52 may be extracted from data sets from one or more data sources, such as client data, third party data from competitors, industry sources, travel agencies, online booking websites, internet service providers, geo tracking, or the like. In some embodiments, typical business mix may additionally or alternatively be derived from mapped data as described herein. For example, first and third party data, such as entity records or receipts, website traffic, online bookings, geo tracking system 10 data, patron phone numbers, patron email addresses, or the like may be mapped by the data mapping engine 44 to connect data sets by identifiers to identify patrons and derive associated segments for similar period or periods.

Typical business mix may be or comprise an expected business mix based historical business determined from past demand data 52 during the same or similar time period, such as during the same time period the previous year or years. For example, a similar period for a hotel client may include past demand during an event that may not have occurred during the same period. In some embodiments, the prediction generator 20 may utilize past demand data 52 for different periods of time with respect to demand for different segments. As an event may not impact all segments, the prediction generator 20 may modify segments impacted from the event and determine segment representation for non-impacted segments using past demand data 52 from the same period the previous year or years. For example, for a hotel client, a local sporting event the week of May 5th may impact a special event segment or a sport event subsegment but not demand from one or more other segments such as business transient segment. However, a similar sport event did not occur the week of May 5th the previous year or years. In one such instance, the prediction generator 20 may utilize past demand data 52 for the special event segment or the sport event subsegment from a period of time in which a similar sport event was held and utilize past demand data 52 for other segments from the same period the previous year or years. In some instances, past demand for one or more segments may be derived from past demand data 52 from one or more proxy data sources with respect to similar entities, such as similarly situated competitor or competitors. Similar entities may be matched with the client 70 with respect to one or more of location, business, scale, business focus, or other entity attribute. In some embodiments, typical business mix with respect to one or more segments may be derived from an aggregate of past demand with respect to two or more of the client 70, industry, or proxy entities, as described above and elsewhere herein.

Generating predicted future demand for business segment mix for the time period 204 may utilize future demand data 54. Prediction of future demand may be based on all available future demand data 54 by each segment to predict future demand. For example, for a hotel client, the prediction generator 20 or demand prediction model 24 thereof may assess future demand data 54 including one or more of actual group hotel room nights on the books for future dates, actual sports groups on the books for future dates, future event data, daily hotel search demand for future dates, percentage of unavailable hotels by day, advertised price levels of hotels by date, daily search demand data for flights, flight reservation data for future dates, actual reserved future room nights, source of reservations, client website traffic, or combination thereof.

In some embodiments, future demand data 54 elements may be weighted by relative importance to predictive value for respective business segments as described herein. For example, future demand data 54 may be weighted by relative importance of the type of data to derive a demand score 82 relative to past demand with respect to particular business sectors. The demand prediction model 24 may be configured to constantly improve the weighting through machine learning algorithms to adapt to various business conditions, times of year and general consumer behavior changes. For example, the prediction generator 20 may receive past demand data 52 and generate predictions with respect to future demand for business segments as described herein. The prediction generator 20 may do this for multiple recent time periods for multiple segments, which may be for a future period for future analysis of past demand data 52 for the future period. This may be done for clients 70 or entities and business segments in which no recommendation action was taken. In this or another example, the prediction generator 20 may apply weights to business conditions, consumer behaviors, and times of year and optimize the weights via machine learning training in a manner similar to that described above.

In some embodiments, generating predicted future demand includes utilizing future demand data 54 from one or more proxy entities, which may include similarly situated entities with respect to one or more of location, business scale, business focus, or other entity attribute. The proxy future demand data 54 may related to one or more business segments.

In various embodiments, the data processor 40 may be configured to assign past demand data 52 and future demand data 54 to identified representative business segments. In some embodiments, the data processor 40 may receive data from data sources wherein all or a portion of the data has been attributed to a segment. For example, a client 70 may enter past demand data 52 or future demand data 54 assigned to segments by the client 70 or that is otherwise pre-assigned to segments.

Data inputs 50 may include segment behavioral factor data. As introduced above, the system 10 may incorporate segment analyses when generating predictions, actionable recommendations 83, or both. Segment behavioral factor data may be used to inform the system 10 with respect to interpretation of future demand data 54. Example segment behavioral factors 56 may include planning cycles, windows, or other behavior factors applicable to segments. For instance, with respect to hotels, consumer travel planning cycles may differ by time of year, focus type of hotel, hotel location, hotel scale, time of year, or otherwise. Consumers may plan travel months in advance during summer and holidays, particularly for resort hotels or hotels focused on longer term stays. These hotels may also observe longer planning cycles any time of year compared to budget and travel hotels. Segment behavioral factors 56 may include typical booking windows. For hotel clients, relevant booking windows for predicting future demand may include those for flights, hotels, or vacation rentals for the various sectors. Segment behavioral factors 56 may include planning windows. For example, for hotel clients, relevant planning windows for predicting future demand may include special event planning windows, business meeting planning windows, or convention/tradeshow planning windows.

As indicated above, booking and planning windows may differ between segments as well as to clients 70. For example, a special event planning window may be longer for leisure travelers with respect to midscale hotels compared to budget hotels, and the special event planning window may be longer for business travelers than leisure travelers with respect to the midscale hotels and essentially nonexistent with respect to budget hotels. In some embodiments, the prediction generator 20 may weight future demand data 54 with respect to a business segment by applicable segment behavior data. For instance, actual reserved rooms for the future period may be weighted more than an area event during the future period for a resort hotel for travel segment while the area event may be weighted more for a budget hotel than actual reserved rooms.

While FIG. 1 illustrates all data inputs 50 being fed to the data processor 40, the data processor 40 may not map all data inputs 50. For example, segment behavioral factors 56 and macro level market conditions may also be input without mapping. The data processor 40 may map past demand data 52 for modeling by the attribution model 38, the output of which may be incorporated into the action recommendation model 34 for purposes of selection of recommendations 83. The data processor 40 may process past demand data 52 by dividing the data by applicable segments for use by the prediction generator 20, which may or may not include mapping. The data processor 40 may process future demand data 54 by dividing the data by sector. Future demand data 54 may be filtered to include data that is one or more of specific to the client 70, client area, client region, client industry, client sector, or client scale. Future demand data 54 may be processed relative to segments.

In some embodiments, the data processor 40 may filter data inputs 50 to remove data that is not relevant to the client 70. For example, past demand data 52 or future demand data 54 with respect to other areas or regions may be filtered out. Past demand data 52 or future demand data 54 corresponding to demand for other industries or sectors in the client's industry may be filtered. For example, past demand data 52 or future demand data 54 related to resort hotels may be filtered from consideration or given little weight for purposes of generating typical business mix or future demand with respect to a budget hotel client. In some embodiments, all or a portion of the past demand data 52 or future demand data 54 may be specific to the client 70 for which the future prediction is generated.

Typical demand for the business segments and predicted future demand with respect to the business segments may be compared 206 by the demand processing model to generate a demand score 82 for the time period to output 208 to the action recommendation model 34. In one embodiment, an aggregate score may be output that indicates if overall demand will be better, the same, or worse relative to past demand. In some configurations, when a worse demand scenario arises an assessment of the factors contributing to the score is made to determine recommended steps. For instance, factors may include scores for various business segments. The demand score 82 may take various forms. For example, the demand score 82 may comprise a number, probability, scorecard, or combination thereof. The score may include multiple components comprising factors impacting the demand score 82. In one example, the demand score 82 comprises an aggregate number or probability. For instance, client 70 may be a hotel and the demand score 82 may comprise a predicted number of occupied rooms, a difference in predicted occupancy and past occupancy for a same or similar time period in the past with respect to the client 70 or other similarly situated business or entity, a probability of an occupancy or occupancy level, a probability of an increased or decreased occupancy relative to a past occupancy for a same or similar time period in the past with respect to the client 70 or other similarly situated business or entity, or other format. In one example, the prediction generator 20 outputs a demand score 82 comprising a multi-component score, which may be represented in a scorecard. The demand score 82 may comprise an aggregate score and predicted demand scores 82 with respect to a plurality of business segments may also be provided. The predicted demand scores 82 for segments may be output in any suitable form, such as numbers, probabilities, or both.

In one embodiment, the prediction generator 20 or demand prediction model 24 may generate a demand score 82 without consideration of past demand data 52. Thus, the demand score 82 may comprise predicted demand for the period of time and the action recommendation model 34 may output one or more recommendations 83 that may be acted on to increase demand, which may be aggregate demand or demand with respect to one or more business segments. In one example, the action recommendation model 34 may output multiple recommendations 83 that are ranked or otherwise noted with predicted impact on aggregate demand or demand with respect to one or more business segments. As noted elsewhere herein, recommendations 83 may be output with an expected cost to implement the recommended action, probability of demand increase or a particular increase in demand, an expected return on investment, or combination thereof.

The demand score 82 may be used to identify an actionable recommendation 83 to maximize demand for one or more segments for the time period 210. The recommendation generator 30 or action recommendation model 34 may ingest the demand score 82 and output an actionable recommendation 83 for the client 70 to maximize demand in the time period based on the delta between typical demand and predicted demand for a given period.

In some embodiments, actionable recommendations 83 may include advertising recommendations. Advertising recommendations may include specification of one or more of advertising coverage, media format, media source, media title, advertisement content, target audience, or other directive. Actionable recommendations 83 may include pricing recommendations such as specific prices, particular platforms or sources from which to make particular prices available, timing of price adjustments, demand based pricing, or other pricing directive or strategy. Actionable recommendations 83 may include specific promotional strategies. Promotional strategies may include advertising or pricing strategies, target audiences, strategic partnerships, timing factors, or combination therefore. An example of a promotional strategy may include a social media advertisement strategy, which may further include an associated pricing strategy. Actionable recommendations 83 may include strategic partnerships. For example, a client 70 may form a strategic partnership with another market participant or stakeholder in the same or different industry, e.g., a hotel may partner with an airline, event center, sporting event, sporting goods store, department store, rewards program, or amusement park. Strategic partnerships may include partnering with an online booking platform. In one embodiment, actionable recommendations 83 may be based on available tactics identified in the system 10, which may include tactics available through partnership agreements that are evaluated based on timing of business need and derived efficacy of effort such as business segment. As described in more detail below, an attribution process including attribution modeling may be employed to determine future efficacy of recommendations.

The demand score 82 may be input into the recommendation generator 30 and the action recommendation model 34 may output an actionable recommendation 83 based on the demand score 82. As described herein, the demand score 82 may include demand scores 82 with respect to business segments. Recommendations 83 may be modeled relative to their impact on demand with respect to one or more business segments.

In one embodiment, the action recommendation model 34 may generate predictions with respect to an expected of demand if the recommended action is performed. This may be provided as an aggregate number, probability, or other suitable form, e.g., representing an expected increase in demand over predicted without taking action. Demand expectation may be output with respect to particular business segments predicted to be impacted by the recommended action. In this or another embodiment, recommendations 83 are accompanied by an expected cost to implement the recommended action, probability of demand increase or particular increase in demand, an expected return on investment, or combination thereof.

In some embodiments, the recommendation generator 30 may output multiple actionable recommendations 83. Each recommendation may be targeted to one or more associated business segments to inform the client 70 regarding targeted business segments from which to choose one or more of the actionable recommendations 83. In one embodiment, the actionable recommendations 83 are accompanied by a demand expectation. In this or another embodiment, the recommendations 83 are accompanied by an expected cost to implement the recommended action, probability of demand increase or a particular increase in demand, an expected return on investment, or combination thereof. In any of the above or another embodiment, the recommendations 83 are output with an associated ranking. The ranking may be by likelihood of the action be the most effective to increase demand, cost, probability or degree of return on investment from action, or other ranking methodology. In one example, actionable recommendations 83 may be ranked by most impactful on segment demand, most impactful on aggregate demand, or a specialized considerations for the client 70, which may be related to an entity attribute of the client 70

In some embodiments, an analysis of market conditions may be made and application of additional weighting in consideration market conditions may be performed if justified by the analysis of market conditions. As introduced above, data inputs 50 may include macro level market condition data 58 such as traveler sentiment, business sentiment, brand demand, or other factors for consideration when generating predictions, actionable recommendations 83, or both. For example, economic conditions may be down, e.g., due to a pandemic or economic downturn, relative to past demand data 52 used for comparison. Thus, demand reflected in the future demand data 54 may be similarly down relative to the past demand data 52. In some embodiments, the prediction generator 20 may scale demand scores 82 or portions thereof to account for the market conditions. Additionally or alternatively, the recommendation generator 30 or action recommendation model 34 may be configured to modify actionable recommendations 83 based on market conditions. For example, multiple actionable recommendations 83 may be output with a ranking. The ranking may be by likelihood of most effective to increase demand, cost, probability or degree of return on investment from action, or other ranking methodology. In one example, the recommendation generator 30 may override a recommendation based on market conditions or output additional information regarding market conditions that the client 70 may consider with respect to whether or to what extent to act on the recommendation. The macro level market conditions may be applied to particular segments in a disproportionate manner to other segments based on the impact. For instance, if business sentiment is down because business are pulling back from business travel or conventions but traveler sentiment is up, demand predictions for business segments such as business travel or business conventions may be scaled downward relative to past demand data 52 levels to reflect the decrease in such business sentiment while demand predictions for leisure travel may be scaled upward relative to past demand data 52 levels to reflect a larger baseline expectation of demand based on positive traveler sentiment relative to the comparative periods in the past demand data 52.

Macro level market condition data 58 may be particular to clients 70 as a whole or to particular areas, regions, industries, industry segments, or portions thereof. For instance, macro level market condition data 58 may be applicable to northern states, metro areas, rural areas, hotels, shopping centers, stores, restaurants, large hotels, business convention or meeting focused hotels, easy access hotels, road travel focused hotels, upscale hotels, budget hotels, resorts, fine dining, take-out focused restaurants, family restaurants, fast food restaurants, grocery stores, general clothing stores, department stores, specialty clothing boutique, shoe stores, convenience stores, office furniture stores, home furniture stores, or other area, region, industry, segment, or portion thereof.

Macro level market condition data 58 may be obtained from various sources. For example, macro level market condition data 58 may be obtained from 3rd party analyses of market conditions, industry surveys, consumer surveys, or the other sources. In one embodiment, the data processor 40 may be configured to analyze past demand data 52 to identify trends indicative of market condition and changes in market condition. In some embodiments, macro level factors derived from macro level market condition data 58 may be used to inform efficacy of actionable tactics based on how they affect each determined segment.

As described above, the various data inputs 50 may be mapped by the data mapping engine 44 to connect data sets to users for identification and tracking in attribution process for use in the attribution model 38 for attributing actions to their impact on demand. Implementing machine learning, this attribution may be fed back into the recommendation features of the system 10 to adjust future action recommendation modeling based on predicted future demand. The attribution model 38 may take the mapped data and attribute actions with impact on demand relative to predicted demand during the time period. The attribution model 38 may consider impact on business segments targeted by the recommendation due to the output demand score 82. The attribution model 38 may also consider impact on other business segments for multiple or cross-segment impact to further refine the action recommendation model 34 in future actionable recommendations 83.

With reference to FIG. 3, a method of data mapping used for attribution to determine effectiveness of recommended actions on demand 300 may include mapping data from multiple data sources specific to date, business, and user using multiple identifiers to cross reference recommended actions with impact on demand by date and segment 302. The method 300 may further include appending other data upon this data within a secure data environment, such as a cleanroom, to pseudo-anonymize and categorize the data with a unique identifier code to develop a master list of user identifier codes 304. The method 300 may further include assigning the master list of identifier codes back to partner data for attribution modeling 306.

Figure 4:
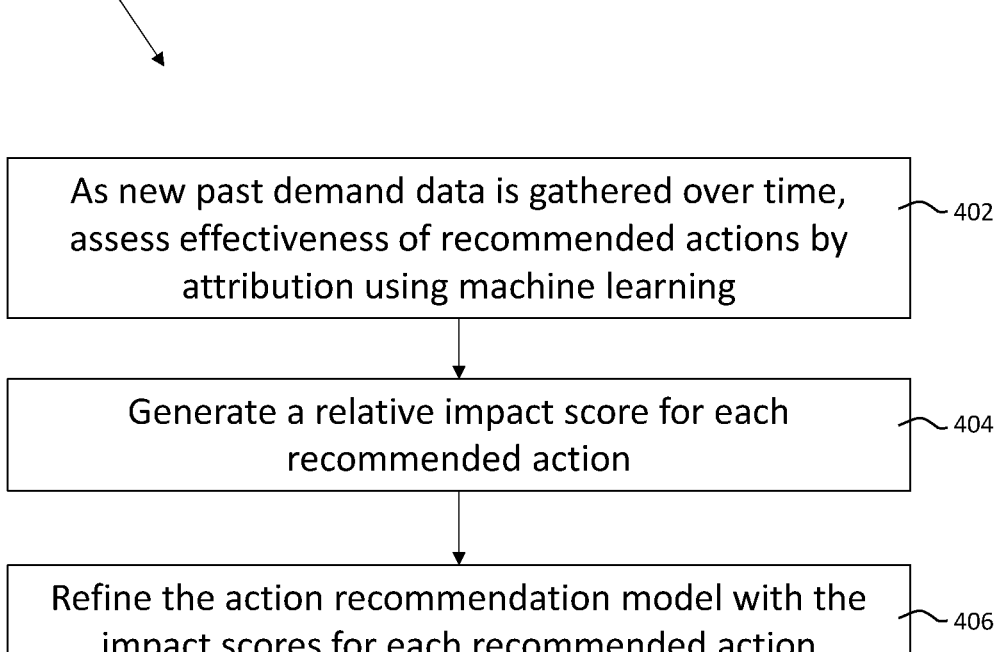
FIG. 4 is a method of attribution and refining the action recommendation model according to various embodiments herein.

With reference to FIG. 4, a method of attribution and refining the action recommendation model 34 may include analyzing past demand data 52 for determination of effectiveness of recommended actions on segment demand. For instance, as new past demand data 52 is gathered over time, effectiveness of recommended actions may be assessed using machine learning 400. Based at least in part on the assessment of the effectiveness or the recommended action, the attribution model 38 may generate a relative impact score for each recommended action 402. The action recommendation model 34 may be refined with the impact scores for each recommended action 404. In some embodiments, generating the relative impact score may comprise utilizing machine learning processes to create the relative impact score for each recommended action to refine future actionable recommendations 83. In one embodiment, the method 400 includes associating the relative impact score with client attributes of the client 70 that received the actionable recommendation 83 to further refine future actionable recommendations 83 by the action recommendation model 34. In an above or another embodiment, the method 400 includes associating the relative impact score with demand score components of the client 70 that received the actionable recommendation 83 to further refine future actionable recommendations 83 by the action recommendation model 34. In one implementation, the method 400 may include excluding users identified in data records in the past demand data 52 that were present in the future demand determination with respect to the client 70 that received the actionable recommendation 83.

FIG. 5 illustrates another example of a method of attribution and refining the action recommendation model 34 500. The method 500 may include mapping or receiving mapped past demand data 52 from multiple data sources from dates relevant to the time period 502. The relevant dates may or may not be those traditionally assigned to the respective business segment. In one example, the relevant dates may be the dates the action was available for exposure to potential consumers and the time period. The method may include identifying data records indicating users received or were exposed to the recommended action 504. The method 500 may include identifying data records indicating the exposed users participated in the demand for the relevant time period 506. The method 500 may include further categorizing the users by business segment 508. Users may be categorized by business segment during the attribution process, which may include data matching aspects. For example, within a secure data environment data records assigned a unique identifier code corresponding to a user may be matched with a targeted business segment exposure and impact on demand corresponding to the business segment. As attribution may be applied to the intent of the recommendation model output, e.g., evaluate the demand impact of recommendations based on] consumer exposure to the action and subsequent demand impact by the consumer with respect to the business during the time period, the matching of the exposure and subsequent demand impact corresponds to the targeted purpose of the actionable recommendation. For example, if the actionable recommendation output to a hotel client relates to increasing luxury demand, users data records traced to luxury bookings matched are verified when data records for exposure to actions targeted to increase luxury booking demand are traced back to the same user via the unique identifier code. The method 500 may further include generating a relative impact score for each recommended action with respect to relative impact on typical demand for relevant business segments 510. The method 500 may further include refining the action recommendation model 34 with the impact scores for each recommended action 512. In some embodiments, generating the relative impact score may comprise utilizing machine learning processes to create the relative impact scores for each recommended action to refine future actionable recommendations 83. In one embodiment, the method 500 includes associating the relative impact score with client attributes of the client 70 that received the actionable recommendation 83 to further refine future actionable recommendations 83 by the action recommendation model 34. In an above or another embodiment, the method 500 includes associating the relative impact score with demand score 82 components of the client 70 that received the actionable recommendation 83 to further refine future actionable recommendations 83 by the action recommendation model 34. In one implementation, the method 500 may include excluding users identified in data records in the past demand data 52 that were present in the future demand determination with respect to the client 70 that received the actionable recommendation 83.

FIG. 6 illustrates another example of a method of attribution and refining the action recommendation model 34 that may include mapping or receiving mapped past demand data 52 and identifying records from dates relevant to the time period 602. The mapped data may be analyzed to assess effectiveness of the recommended action on segment demand relative to typical segment demand 604. The method 600 may include generating a relative impact score for the recommended action with respect to relative impact on typical demand for relevant business segments 606, and refining the action recommendation model 34 with the impact score for the recommended action 608. In some embodiments, generating the relative impact score may comprise utilizing machine learning processes to create the relative impact score for each recommended action to refine future actionable recommendations 83. In one embodiment, the method 600 includes associating the relative impact score with attributes of the client 70 that received the actionable recommendation 83 to further refine future actionable recommendations 83 by the action recommendation model 34. In an above or another embodiment, the method 600 includes associating the relative impact score with the demand score 82 components of the client 70 that received the actionable recommendation 83 to further refine future actionable recommendations 83 by the action recommendation model 34. In one implementation, the method 600 may include excluding users identified in data records in the past demand data 52 that were present in the future demand determination with respect to the client 70 that received the actionable recommendation 83.

In one embodiment, the attribution model 38 may take the mapped data and attribute actions with impact on demand relative to demand expectation. The attribution model 38 may compare actual demand resulting from a recommended action with a demand expectation output by the action recommendation model 34 to further refine predictive accuracy of recommended actions and impact on demand.

In some embodiments, the demand score 82 or output to the action recommendation model 34 also incorporates client attributes that the action recommendation model 34 uses to increase predictive accuracy of the impact a recommended action will have on demand for the client 70. For example, effectiveness of recommended actions may be weighted with respect to one or more client attributes. Client attributes may include one or more of location (e.g., regional, area, city, county, state, economic district, community type (urban, suburban, rural), off interstate/ease of access, city center, roadside, satellite, or combination thereof), business scale (e.g., luxury, upscale, upper midscale, midscale, lower midscale, or budget), or business focus (e.g., resort or destination, extended stay, transient, business travel, convention or meeting, road travel, or combination thereof). Accordingly, the attribution model 38 may include relevant client attributes in the attribution data fed to the recommendation model 34 to further refine accuracy of actionable recommendations 83.

In a further embodiment, the attribution data fed back to the action recommendation model 34 may be utilized to further refine actionable recommendations 83 based on combinational analysis of demand scores 82 by business segment, economic conditions, location, scale of business, business focus, time, seasons, or combination thereof. For example, positive attribution data from an action taken by a midscale client focusing on weekend leisure travel, wherein the future demand score 82 predicted decreases in three business segments, may be applied or weighted more heavily with respect to future actionable recommendations 83 for clients 70 having a similar demand score 82, e.g., predicted decrease in demand in one or more of the same business segments. This may be further extended to client attributes, such as those having one or more of a similar business scale, business, time, or season. For instance, the demand impact of the recommended action may be associated with a higher probability of similar effectiveness for a lower midscale client focusing on extended weekend leisure travel in a similar location with a demand score 82 predicting a decrease in two of the same business segments and unchanged demand in the other business segment than for an upscale client focusing on resort travel having a demand score 82 predicting a decrease in one of the same business segments and a demand increase in the other two business segments.

Business segments may have different planning cycles. Depending on timing of need different planning cycle timeframes may be utilized with respect to data selection for mapping and attribution. Similarly, different planning cycle timeframes may be utilized with respect to evaluation of future demand data 54. Analysis of past demand data 52 may be employed to identify and support application of different planning cycles to different segments and which may also extend to client attributes. For example, leisure travelers may tend to follow a longer planning cycle for resort hotels than midscale hotels.

In various embodiments, the system 10 may include or electronically communicate with a database that stores or is configured to store the data from the various data sources. For example, data source data may be compiled into the database, which in one configuration comprises one central location. One or more of the prediction generator 20, recommendation generator 30, or data processor 40 may be configured to communicate with the database to one or more of access, receive, or deposit data source data. It is to be understood that data source data includes data inputs 50. The system 10 may access the data source data as described herein to process and otherwise act on with the data. System 10 may include a graphical user interface configured to receive instructions by a client or other user to generate demand scores 82 and corresponding action recommendations 83. In some embodiments, the processed, mapped, or unprocessed data source data may be accessible to users via the user interface. The user interface may be configured to present the data and corresponding findings described herein, such as actionable recommendations, demand score, or the like in a manner accessible to users. In one example, the graphical interface may be utilized by marketing management teams to execute the models and receive the strategic actionable recommendation 83 output by the system 10.

In various embodiments, one or more of the operations of the various systems and methods described herein, such as system 10, methods 200, 300, 400, 500, or 600, and the various modifications, additional features, and alternative features may be under automated control. Such operations may be programed to execute automatically, without human interventions. Automation removes deficiencies in current solutions such as dash boards that require human interpretation leading to errors in interpretation, accuracy, and understanding. In some configurations, the systems and methods described herein may operate autonomously, requiring only identification of a subject client or business for which to base the predictions and recommendations. In one embodiment, the systems and methods may be programed to execute predictions and recommendations according to a schedule. In some embodiments, the systems and methods may autonomously evaluate and update weights. In an above or another embodiment, the systems and methods may autonomously evaluate effectiveness of actionable recommendations and refine the action recommendation model.

Figure 7:
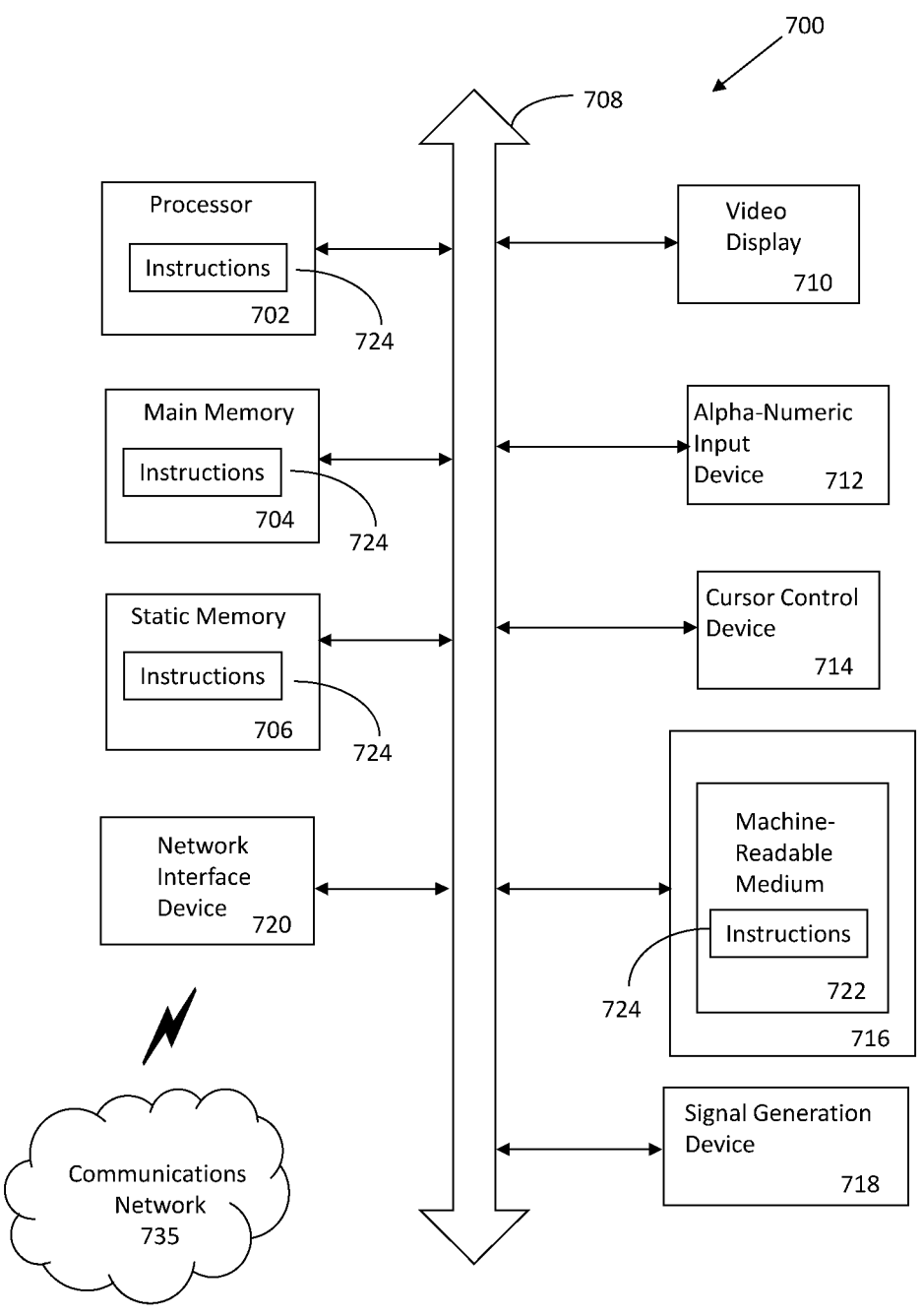
FIG. 7 is a schematic diagram of a machine in the form of a computer system within which a set of instructions, when executed, may cause the machine to perform prediction, recommendation, and attribution operations of the demand generation system according to various embodiments described herein.

Referring now also to FIG. 7, at least a portion of the methodologies and techniques described with respect to the exemplary embodiments of the system 10 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 10. For example, the machine may be configured to, but is not limited to, assist the system 10 by providing processing power to assist with processing loads experienced in the system 10, by providing storage capacity for storing instructions or data traversing the system 10, or by assisting with any other operations conducted by or within the system 10. As another example, the computer system 700 may assist with generating models associated with generating predictions, refining models, processing data, mapping data, generating future demand predictions, generating demand scores, generating action recommendations, attribution modeling, tracking or identifying instances and/or users in data records receiving or presented with recommended actions, tracking or identifying instances and/or users in data records contributing to demand during a relevant time period, tying demand impact outcomes to recommended actions driven by data aggregation to create a continuous learning loop to improve output actionable recommendations to drive better results, combine all relevant tourism data and create predictive models with specific recommendations that are proven effective over time through attribution and machine learning, refining the action recommendation model, performing and/or generating machine learning algorithms to create relative impact scores to refine future actionable recommendations, improving weighting of future demand data by relative importance to future demand predictions by applying machine learning algorithms to adapt weighting to changes in business conditions, times of year, and consumer behavior, or a combination thereof.

In some embodiments, the machine may operate as a standalone device. In some embodiments, the machine may be connected to and assist with operations performed by other machines and systems, such as, but not limited to, any functionality, generator, adjuster, mapping tool, model, engine, executor, or other functionality described herein, any of which may be provided by such other machines or systems to the machine for use by system 10 in performance of the operations described herein. The machine may be connected with any component in the system 10. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 735, another network, or a combination thereof, can send or receive voice, video or data, and communicate over the communications network 735, another network, or a combination thereof, using the instructions. The instructions 724 may further be transmitted or received over the communications network 735, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A demand generation system, the system comprising:
a processor;
a memory storing instructions that when executed by the processor preforms operations comprising:
   determining, using a demand prediction model, with respect to a business, typical demand from business segments of a business segment mix for a future time period using past demand data;

generating, using the demand prediction model, with respect to the business, predicted future demand from the business segments of the business segment mix for the future time period using future demand data;

comparing the typical demand from the business segments of the business segment mix with the predicted future demand from the business segments of the business segment mix;

automatically generating a demand score based at least in part on the comparison;

automatically inputting the demand score into an action recommendation model to output an actionable recommendation that maximizes demand for one or more from the business segments of the business segment mix for the future time period;

mapping, using a data mapping engine, past demand data from multiple data sources for dates relevant to the future time period and action specified by the actionable recommendation, wherein the data mapping engine assigns a master list of unique identifier codes within a secure data environment to pseudo-anonymize user data records;

identifying, using the unique identifier codes, a set of one or more users associated with a data record revealing exposure to the action specified by the actionable recommendation and impact to the demand of the business during the future time period;

categorizing the users in the set of one or more users into business segments;

automatically generating, using an attribution model, a relative impact score for the actionable recommendation that is representative of relative demand impact attributable to the action specified by the actionable recommendations for the business segments; and refining the action recommendation model with the impact scores for the business segments.

2. The system of claim 1, wherein the operations further comprise differentially weighting future demand data elements with respect to business segments, the weighting reflective of predictive value of the future demand data element to future demand associated with the respective business segment.

3. The system of claim 2, wherein the operations further comprise applying machine learning to constantly assess predictive value of future demand data elements for respective business segments to adapt weighting to business condition, time of year, consumer behavioral change, or combination thereof.

4. The system of claim 1, wherein the operations further include weighting the future demand data by relative importance to predictive value for each business segments represented in the business segment mix.

5. The system of claim 1, wherein the business is a hotel.

6. The system of claim 5, wherein the business segment mix includes:

business transient;

marketable leisure travelers which may optionally be further segmented by one or more of location, key demographics, or travel motivations;

visiting friends/family; special events; business events;

sports groups;

scale; or combination thereof.

7. The system of claim 1, wherein the actionable recommendation includes a value representing a predicted expectation of demand if the action specified by the actionable recommendation is taken.

8. The system of claim 1, wherein the actionable recommendation includes a plurality of actionable recommendations, and wherein the plurality of actionable recommendations are ranked by one or more of predicted effectiveness of the action specified by the actionable recommendation increasing demand, predicted cost associated with the action specified by the actionable recommendation, predicted return on investment, or combination thereof.

9. The system of claim 1, wherein the actionable recommendation includes a plurality of actionable recommendations, and wherein the plurality of actionable recommendations are ranked by one or more of most impactful on segment demand, most impactful on aggregate demand, or a specialized consideration with respect to an attribute of the business.

10. A method of facilitating increased demand, the method comprising:

determining, using a demand generator including a demand prediction model, typical demand for a business with respect to a plurality of business segments of a business segment mix for a future time period using past demand data;

generating, using the demand generator, predicted future demand for the business from the respective business segments of the business segment mix for the future time period using future demand data;

comparing, using the demand generator, the typical demand from the business segments of the business segment mix with the predicted future demand from the business segments of the business segment mix;

automatically generating, using the demand generator, a demand score based at least in part on the comparison;

automatically inputting the demand score into an action recommendation model to output an actionable recommendation that maximizes demand from one or more of the business segments of the business segment mix for the future time period;

mapping, using a data mapping engine, past demand data from multiple data sources for dates relevant to the future time period and action specified by the actionable recommendation, wherein the data mapping engine assigns a master list of unique identifier codes within a secure data environment to pseudo-anonymize user data records;

identifying, using the unique identifier codes, a set of one or more users associated with a data record revealing exposure to the action specified by the actionable recommendation and impact to the demand of the business during the future time period;

categorizing the users in the set of one or more users into business segments;

automatically generating, with the attribution model, a relative impact score for the actionable recommendation that is representative of relative demand impact attributable to the action specified by the actionable recommendations for the business segments; and refining, using the attribution model, the action recommendation model with the impact scores for the business segments.

11. The method of claim 10, further comprising differentially weighting future demand data elements with respect to business segments, the weighting reflective of predictive value of the future demand data element to future demand associated with the respective business segment.

12. The method of claim 11, further comprising applying machine learning to constantly assess predictive value of future demand data elements for respective business segments to adapt weighting to one or more of business conditions, times of year, and consumer behavioral changes.

13. The method of claim 10, further comprising weighting the future demand data by relative importance to predictive value for each business segments represented in the business segment mix.

14. The method of claim 10, wherein the business is a hotel.

15. The method of claim 14, wherein the business segment mix includes:

business transient;

marketable leisure travelers which may optionally be further segmented by one or more of location, key demographics, or travel motivations;

visiting friends/family;

special events;

business events;

sports groups;

scale; or combination thereof.

16. The method of claim 10, wherein the actionable recommendation includes a value representing a predicted expectation of demand if the action specified by the actionable recommendation is taken.

17. The method of claim 10, wherein the actionable recommendation includes a plurality of actionable recommendations, and wherein the plurality of actionable recommendations are ranked by one or more of predicted effectiveness of the action specified by the actionable recommendation increasing demand, predicted cost associated with the action specified by the actionable recommendation, predicted return on investment, or combination thereof.

18. The method of claim 10, wherein the actionable recommendation includes a plurality of actionable recommendations, and wherein the plurality of actionable recommendations are ranked by one or more of most impactful on segment demand, most impactful on aggregate demand, or a specialized consideration with respect to an attribute of the business.

* * * * *